United States Patent [19]

Le Pesant et al.

[11] Patent Number: 4,789,228

[45] Date of Patent: Dec. 6, 1988

[54] ELECTRICALLY CONTROLLED OPTICAL SWITCHING DEVICE

[75] Inventors: Jean-Pierre Le Pesant, Gif sur Yvette; Michel Hareng, La Norville; Bruno Mourey, Boulogne Billancourt, all of France

[73] Assignee: Thomson-CSF, Paris, France

[21] Appl. No.: 4,222

[22] Filed: Jan. 5, 1987

Related U.S. Application Data

[63] Continuation of Ser. No. 662,154, Oct. 18, 1984, abandoned.

[30] Foreign Application Priority Data

Oct. 21, 1983 [FR] France ................. 83 16793

[51] Int. Cl.⁴ ............... G02B 26/00; G02B 6/26; G02B 6/42; G02F 1/01
[52] U.S. Cl. ................. 350/355; 350/96.15; 350/96.2; 350/359
[58] Field of Search ............. 350/96.15, 355, 359, 350/96.2

[56] References Cited

U.S. PATENT DOCUMENTS

| | | | |
|---|---|---|---|
| 4,385,799 | 5/1983 | Soref | 350/96.13 |
| 4,516,837 | 5/1985 | Soref et al. | 350/96.15 |

FOREIGN PATENT DOCUMENTS

| | | |
|---|---|---|
| 0075704 | 6/1982 | European Pat. Off. . |
| 0090723 | 3/1983 | European Pat. Off. . |
| 3124488 | 8/1982 | Fed. Rep. of Germany . |
| 2548795 | 7/1983 | France . |
| 2543320 | 9/1984 | France . |
| 2088077 | 6/1982 | United Kingdom . |

OTHER PUBLICATIONS

Applied Optics, vol. 19, No. 7, Apr. 1, 1980, New York (U.S.), W. J. Tomlinson: "Applications of GRIN-Rod Lenses in Optical Fiber Communication Systems", pp. 1127–1138.

Primary Examiner—Bruce Y. Arnold
Attorney, Agent, or Firm—Oblon, Fisher, Spivak, McClelland, & Maier

[57] ABSTRACT

The present invention concerns a device where the commutation of a luminous beam is ensured by the electrically controlled presence or absence, on the path of the beam, of a fluid causing said beam to be transmitted or reflected. The invention provides for improved decoupling between the output channels of the device, due to the presence of a surface provoking a total internal reflection that allows one to eliminate interference reflections.

9 Claims, 4 Drawing Sheets

PRIOR ART
FIG. 1
FIG. 2
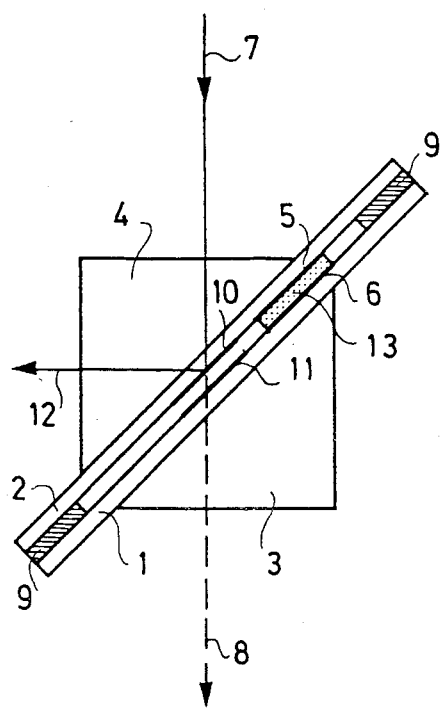
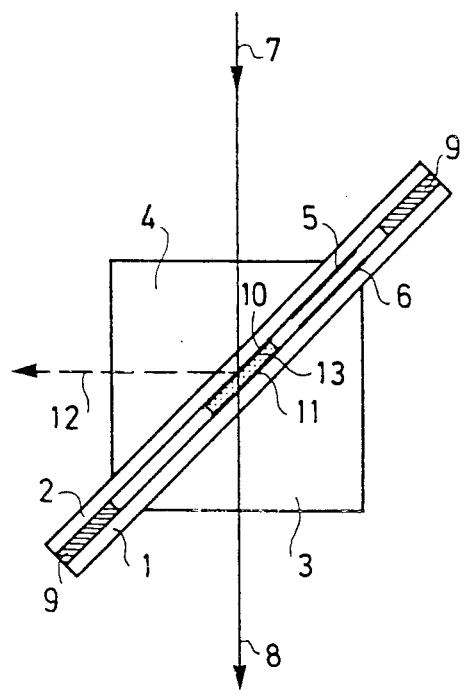

ELECTRICALLY CONTROLLED OPTICAL SWITCHING DEVICE

This application is a continuation of application Ser. No. 662,154, filed Oct. 18, 1984, now abandoned.

BACKGROUND OF THE INVENTION

1. Field of the invention

The present invention concerns device for rapidly switching or changing-over a luminous beam, in particular when this luminous beam carries coded data. One of the specific applications of the invention concerns optical or light switching between optic fibers.

2. Description of the prior art

Among the dispositions of the prior art can be cited structures in which the space deflection of an optical beam is carried out by mirrors constituted by semi-reflecting layers that introduce losses which are not negligible (hardly lower than a square centimeter). Devices are also known where the deflection of luminous beams is introduced by the total reflection of the light in electro-optical crystals. The drawback of these devices resides in the crystal itself, in general lithium niobate which, for reasons of purity, is only available in small dimensions which implies that the pitch of the electrodes that it bears and which act to apply thereto an electric control field is very small. Consequently, electro-optical crystal devices optical systems. Furthermore, the crystal reacts only slightly to the electric field, which implies use of high control voltages.

With the aim of overcoming these problems, the applicant filed on July 4. 1983 a French patent application under No. 83 11074 and entitled: "Dispositif de commutation optique á deplacement de fluide et dispositif de composition d'une ligne de points" no French Pat. No. 2,548,795. This invention proposed to use electrically controlled movements of very small volumes of liquid without the intervention of moving mechanical elements, in order to modify locally the refraction conditions encountered by the luminous beams that are propagated in the device. These refraction modifications allow to shift the paths of the luminous beams and thus to realize a change-over between the various propagation paths, especially between the optic fibers. It is therefore possible to realize change-over devices comprising electrically controlled means of liquid displacement that allow causing very small volumes of this liquid in the form of layers or globules to flow from one zone to another under the action of electrically generated moving power due to the local variations of electrical fields due to the stepwise voltage application on the control electrodes. The distance between the electric field application electrodes can be, in this utilization, in the range of tens of micrometers. To facilitate the practical realization and so as not to excessively "diaphragm" the luminous beams, it is advantageous to provide electrodes that are transparent to the luminous radiance involved, it is possible to use, for example, electrodes made of mixed indium and tin oxide (ITO electrodes) disposed on glass and engraved by microlithography. The drawback of this solution is the introduction of supplementary interfaces, typically, between glass and transparent electrode and between transparent electrode and confined fluids (gas or liquid), as well as the introduction of a layer (transparent electrode) generally more refractive than its carrier or support and the confined fluid. The disparity in refraction indice of the mediums crossed by the luminous rays brings about the existence of interference reflections that are prejudicial to the detection of signals levels.

SUMMARY OF THE INVENTION

In order to overcome these drawbacks, the invention proposes protecting by total internal reflection the output channels that do not transmit data or which transmit a data different to that of the adjacent channels.

One object of the present invention is therefore to provide an optical change-over device of at least one incident luminous beam through electrical control switching means, the switching means consisting in placing on the path of the said beam either a first fluid provoking the internal reflection of the beam, or a second fluid provoking its transmission, the device being constituted by two elements forming total internal reflection prisms facing each other with respect to their hypothenuses and defining a confinement space containing the said fluids, the fluids not being miscible and possessing distinctive dielectric permittivities; the device also comprising inductor means having an electric field gradient which causes the fluid having the higher permittivity to converge towards a zone of the confinement space, which is exposed to the electric field, wherein one of the said prisms is truncated so as to present a face parallel to the confinement space and wherein at least one of the possible optical paths for the beam comprises at least one total internal reflection on the said parallel face, while the other prism extracts the commutated beam.

BRIEF DESCRIPTION OF THE DRAWINGS

The invention will be better understood and the other features, objects and advantages will become more apparent from the following description, given with reference to the appended drawings in which:

FIGS. 1 and 2 schematically represent an optical change-over device according to the prior art;

DETAILED DESCRIPTION OF THE PREFERED EMBODIMENT

Figure 3:
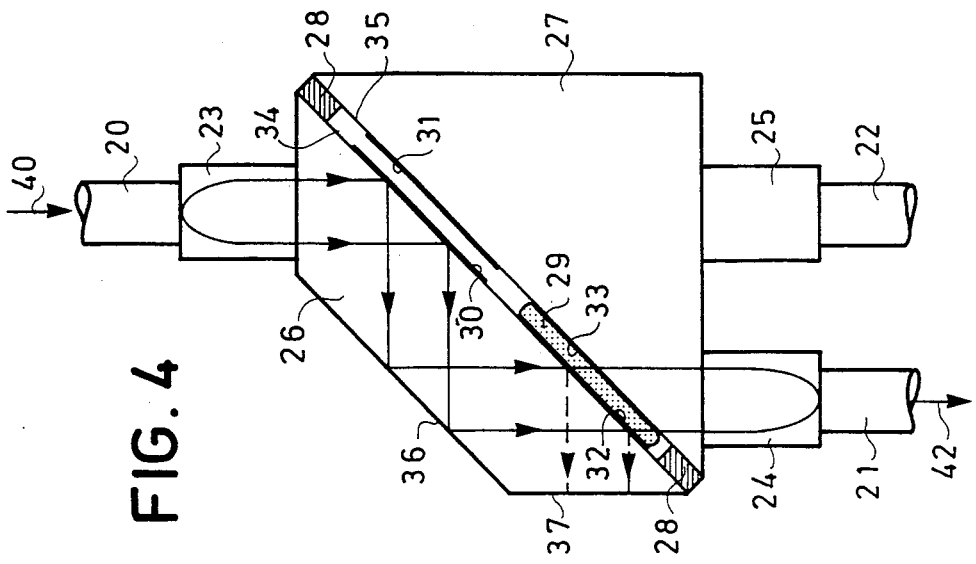
FIGS. 3 and 4 represent optical change-over devices according to the invention.

The displacement of one or several fluid globules from one position to another and the physical origin of the forces that allow to initiate and control these displacements have been described in the applicant's French Patent application filed on March 23, 1983 under No. 83 04745 now French Pat. No. 2,543,320.

Despite this, it is useful to recall briefly the physical phenomena that intervene in liquid layer displacement devices. An electrically controlled device for the displacement of a fluid comprises a capillary space where at least two non-miscible dielectric fluids are made to coexist. The height of the capillary space is chosen equal to or lower than one millimeter so that the capillar phenomena are stronger than the gravitational forces. Pairs of electrodes are disposed on the elements that define the capillary space so as to be able to act on the fluids present in this space. The application of electric fields in the capillary space, through the intermediary of pairs of electrodes, creates about the moving forces able to displace fluids. The physical origin of the moving forces is explained by the presence in the relevant substances of positive and negative electrical charges that can be freed or bound. In the presence of an inductor electrical field, the free charges can be displaced in the entire volume of the material subjected to the electric field, thus constituting the electric conduction phenomenon. This phenomenon is not exploited within the scope of the present invention although a low conductivity of the fluids utilized can be accepted. On the other hand, the electric charges bound to the atoms and the molecules give rise to electric dipole moments. The material medium reacts to an inductive electrical field by an electrical polarization which entails the creation of a volumic displacement force able to overcome the recall forces such as the superficial voltage forces.

FIGS. 1 and 2 are cross-sectional schematic views of an optical change-over device according to the prior art. The device comprises two rigid confinement plates 1 and 2, for example glass plates, delimiting the capillary space defined by the spacing wedges 9. The internal faces of plates 1 and 2 have undergone a preparation that consists in appropriate cleaning and applying surface layer deposits adapted to prevent capillary films from being formed by the liquid the displacement of which it is to be electrically controlled. The control electrodes are constituted by a pair of electrodes 5 and 6 and of a pair of electrodes 10 and 11. They are connected to a voltage generator (not represented) intended to supply a differential potential across the electrodes of each pair. The device comprises a globule 13 to be displaced in a second fluid that can be air. Globule 13 is chosen from among the hydrocarbons such as $C_5$ to $C_{25}$ alkanes, cetones or nitrated derivatives. On the external faces of plates 1 and 2 are glued total reflection prisms 3 and 4. A luminous beam 7 is sent under an oblique incidence angle toward the electrode 10. The inclination of beam 7 is chosen so as to render possible of a total reflection on the internal face of plate 2. Beam 7 crosses prism 4 and arrives on the internal face of plate 2. Two cases can thus occur, according to the nature of the fluid comprised between the electrodes 10 and 11.

Beam 7 is reflected in the form of a beam 12 when the volume controlled by electrodes 10 and 11 is occupied by a gas such as air of which the optical refraction index is about 1, whereas that of the glass of the plate 2 is about 1.5. This is represented in FIG. 1.

If the volume controlled by electrodes 10 and 11 is occupied by the globule 13 initially situated between electrodes 5 and 6, the refraction index of this zone passes to a value that is typically comprised between 1.4 and 1.7. Under these conditions, the total reflection on the internal face of glass plate 2 is suppressed and beam 7 is transmitted so as to form beam 8, as shown on FIG. 2.

The electric control of the device represented in FIGS. 1 and 2 is carried out as follows. In the absence of electrical excitation, the globule remains in the position where it previously was and beam 7 is reflected to form beam 12 (for example, as shown on FIG. 1). If a differential potential is applied across the electrodes 10 and 11 and the electric field thus induced is sufficient, the globule is placed between the electrodes and will remain there after suppression of the electrical field. Beam 7 is thus transmitted in the form of beam 8. To cause the globule to leave again its location between electrodes 5 and 6, it is necessary to reverse the control process. This device obviously is an electrically controlled optical device.

This device is formed by the association of several elements that determine the interfaces which, as is known, encourage interference reflections. The number of elements comprising the change-over device can be reduced by engraving the electrodes directly on the prisms. Furthermore, the engraving of the electrodes can be sufficiently thin so as not to introduce too many interferences. These reflections are particularly prejudicial when the luminous beam is transmitted through the intermediary of a globule. In fact, the index adaptation between the various elements situated on the path of the luminous beam to be transmitted not being perfect, interference reflections exist at the globule-electrode trode or globule-prism interfaces. In this case, represented in FIG. 2, an incident luminous beam 7 will be transmitted in the form of an output beam 8, while an interference beam 12 is produced, which is not negligible in all applications.

If the incident beam 7 is intended to be commutated into a beam 12 as indicated in FIG. 1, no interference beam problem does arise. Indeed, if the total reflection prisms are manufactured in a satisfactory manner, the quantity of light transmitted in a direction 8 is practically zero. The problem to be overcome is thus the elimination of interference reflections in the case of a beam transmitted through the intermediary of a fluid.

FIG. 3 represents an optical change-over device according to the invention. It has been decided to convey the luminous input and output beams through optical fibers, their paths can also be realized in the air. The optical change-over device per se is formed by total reflection prisms 26 and 27 of which the faces 34 and 35, forming the internal faces of the device, define, through the intermediary of spacing wedges 28, the capillary space where globule 29 can be displaced in an air layer. Faces 34 and 35 support transparent electrodes: electrodes 30 and 31 form a first pair of electrodes, the second pair being formed by electrodes 32 and 33. These electrodes are connected to a voltage generator (not represented) that will supply the voltages necessary for the control of the displacement of globule 29. The essential difference with the device represented in FIGS. 1 and 2 is constituted by face 36 parallel to face 34 and which cuts the apex at right angle of prism 26. The surface state of face 36 has been improved by polishing. Another difference which results from the first, is the parallelism of the input and output luminous beams. Fibre 20 conveys the luminous beam to be switched towards one of the output fibers 21 or 22. The luminous beams are collimated by lenses 23, 24 and 25 of the index gradient type, glued to total reflection prisms 26 and 27.

In the device represented in FIG. 3, globule 29 has been placed between electrodes 30 and 31, or has occupied this position initially. It has a refraction index close to that of the prisms. In this case, a luminous beam 40 carried by fibre 20 is transmitted to fiber 22 in the form of a luminous beam 41, as indicated by the lines traced in a thin arrowed line. The interface constituted by prism 26, electrode 30 and globule 29 gives rise to interference luminous beams that are reflected in a direction perpendicular to the incident beam. The interface constituted by prism 27, electrode 31 and globule 29 can also, to a lesser degree, produce interference rays. The luminous rays reflected by the blade 26-globule 29 interface are represented by dotted and arrowed lines. Face 36, inclined at 45° with respect to the rays reflected by the interface, sends them back towards face 34 which in the same way sends them back towards face 37 of the prism. At this site, the angle formed by the reflected rays and face 37 being a right angle, they leave the device. A very complete decoupling between the output fibres 21 and 22 has thus been achieved.

Figure 4:
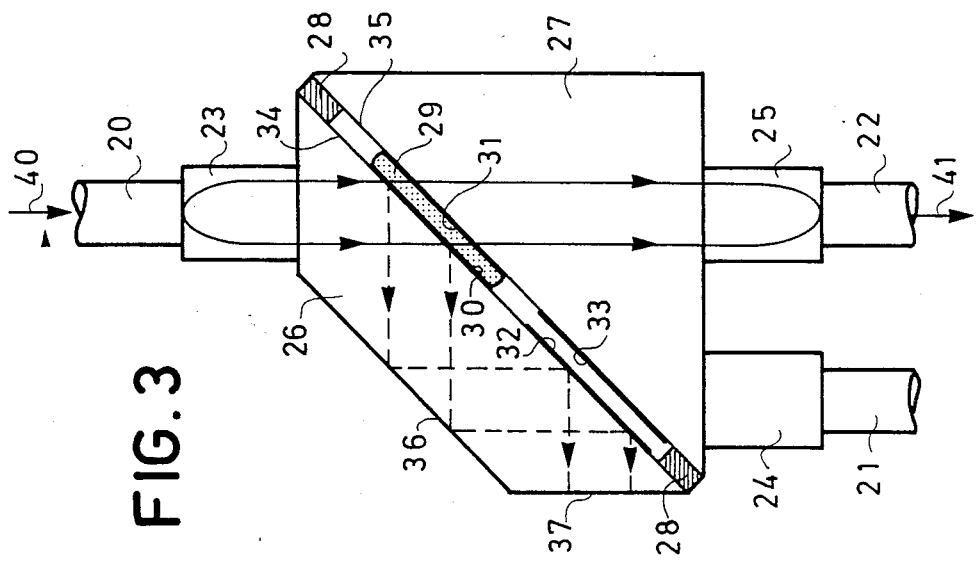

FIG. 4 shows the optical change-over device described hereinabove and where the same references represent the same elements. Through electrical control, globule 29 has been brought between electrodes 32 and 33. In this case, a luminous beam 40 conveyed by optics fiber 20 undergoes a total reflection on face 34 of prism 26 provided that electrode 30 is sufficiently thin in order not to create substantial interferences. The reflection on face 34 is all the more satisfying when there exists an index jump between the prism and the space situated between electrodes 30 and 31. Face 34 thus reflects the luminous beam towards face 36 which also sends it back in the direction of globule 29, which transmits the light towards fibre 21, the latter thus will convey a luminous beam 42. The path of the luminous beam in the change-over device is represented in thin arrowed lines. At the level of the interface between prism 26 and globule 29 there is, as represented in FIG. 3, interference reflection takes place. This interference reflection, represented by dotted arrowed lines issues from the device by face 37. Decoupling between the output channels is once again very good here.

It also lies within the scope of the invention to dispose several commutators in series in order to have, starting from an input fibre, a possibility of access to several fibres. On the other hand, such a structure allows access to one fibre from several input fibres, while avoiding interference reflections.

Figure 5:
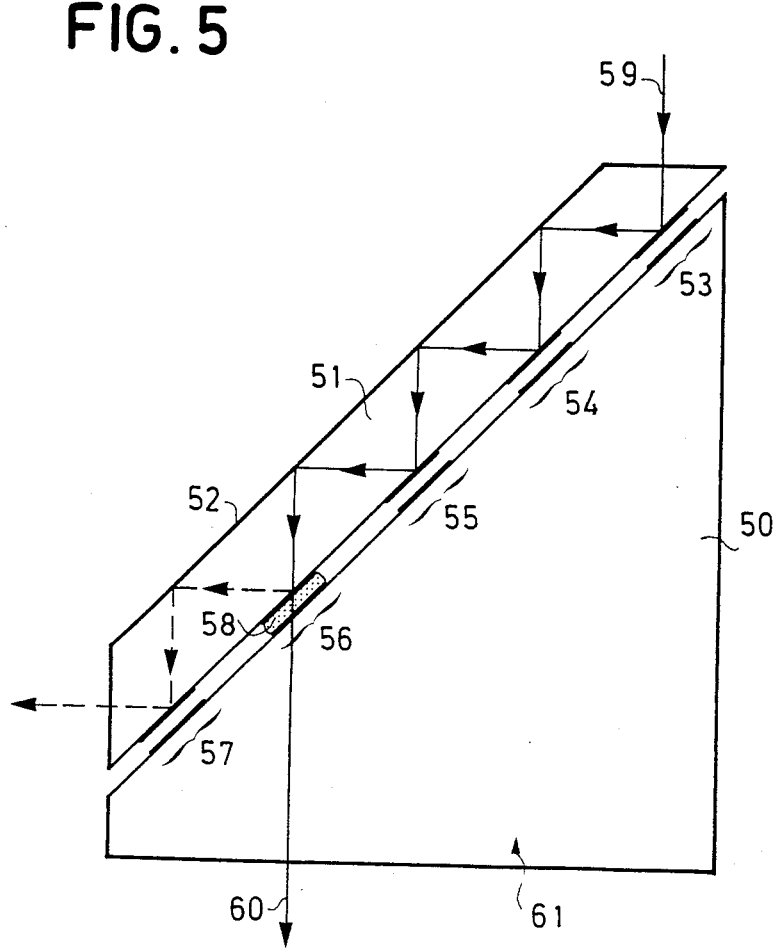
FIGS. 5 and 6 concern an optical change-over device in cascade according to the invention.

FIG. 5 shows schematically an optical change-over structure in cascades according to the invention. The structure is formed by the association of two total reflection prisms disposed so as to meet the propagation conditions of a luminous beam, as described hereinabove. Prism 50 and prism 51 of which the apex is truncated and of which the face 52 has been polished, define a capillary space in which the fluid is liable to be displaced by electric control. With this aim, the electrodes, disposed in pairs, are engraved on the internal faces of the prisms. For a structure having five outputs, it is necessary to dispose of five pairs of electrodes 53, 54, 55, 56 and 57. Through electrical control, a dielectric globule 58 can be successively displaced from one pair of electrodes to another pair in order to arrive between the pair of electrodes disposed on the desired path of the luminous beam. FIG. 5 shows a possible change-over example for a luminous beam 59 entering perpendicularly to the face of prism 51 and for which the conditions of total reflection on the internal face of said prism are met. The light beam undergoes reflections in cascade on the inner face of prism 51 as well as on its face 52 that also meets total reflection conditions. The luminous beam is transmitted when the continuity of the refraction indices of the mediums that it encounters is warranted. It thus crosses globule 58 located between the pair of electrodes 56 in order to constitute a beam 60 which issues perpendicularly at face 61 of prism 50. Interference light reflections, represented in arrowed dotted lines, are produced at the prism 51-globule 58 interface are therefore evacuated from prism 51 in a direction other than those of the outputs envisaged for the luminous beam. To obtain as short an idling time of the device as possible, it is avoided displacing the globule 58 over the entire length of the capillary interval delimited by prisms 50 and 51. To this end, a pair of electrodes is used which is situated in a plane perpendicular to the plane of the drawing.

Figure 6:
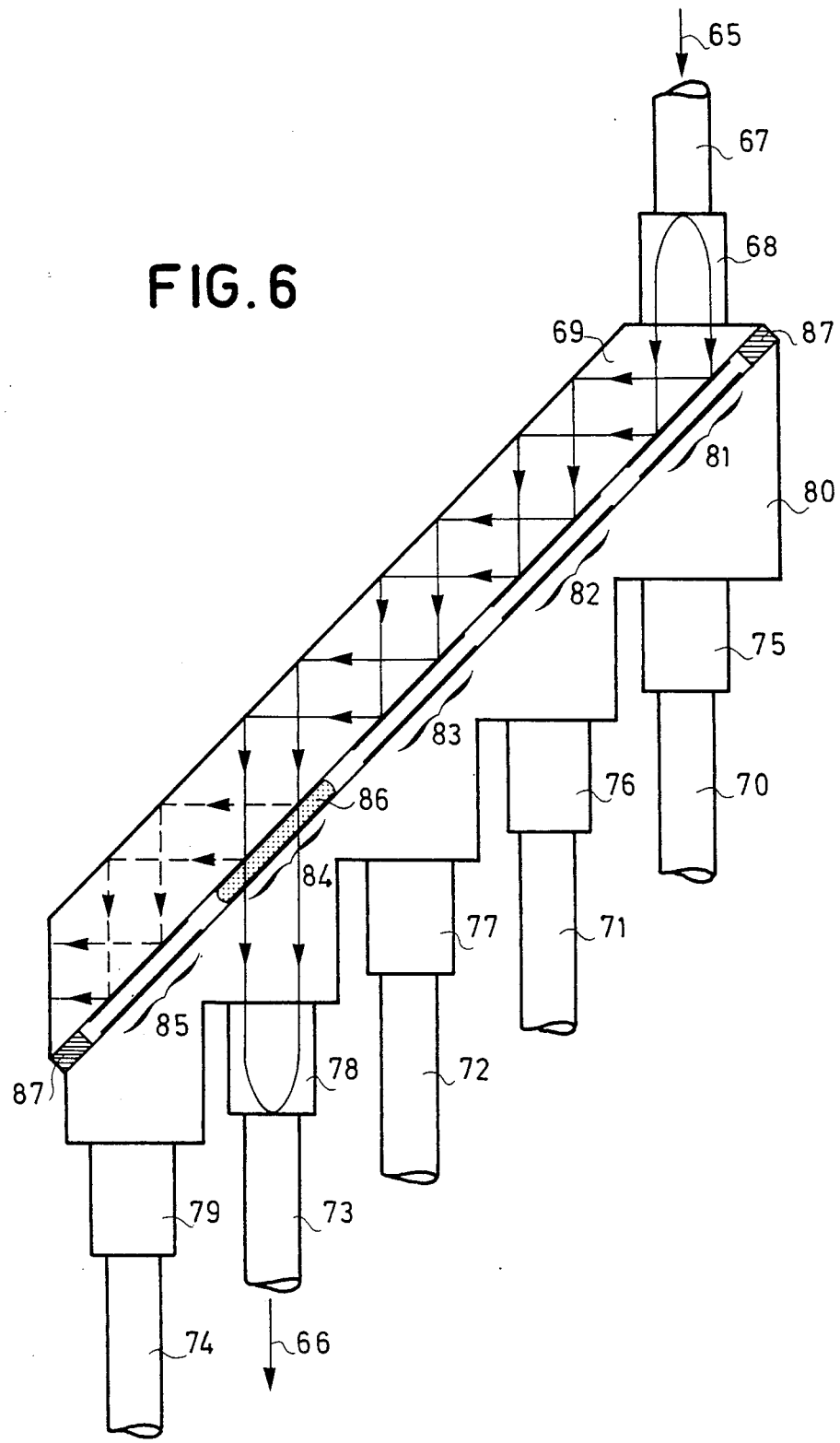

FIG. 6 shows a practical application of the structure schematically represented in FIG. 5. The input light beam 65 is conveyed by an optical fibre 67 and reaches the truncated prism 69 through the intermediary of the index gradient lens 68. The output luminous beam 66 can be conveyed by one of fibres 70 to 74 associated respectively to lenses 75 to 79 glued on to prism 80. Prism no is cut in cascade so as to reduce the length of the optical paths and to avoid light dispersions. Pairs of electrodes 81 to 85 control the displacement of the globule 86 in the capillary space situated between prisms 69 and 80 and defined by spacing wedges 87. In the device represented in FIG. 6, the globule 86 is displaced from one pair of electrodes to another by successive steps. For example, in order to displace the globule from one pair of electrodes 81 to pair 85, it is necessary to cause it to pass through pairs 82, 83 and 84. A displacement variant is that described here-in-above with reference to FIG. 5.

This change-over structure corresponds to distributors which possibly split up input luminous energy to direct it towards several output fibres. One of the possible ways of dividing up luminous energy consists in only transmitting part of an incident luminous beam through the intermediary of a globule, the other part being reflected towards another stage of the cascade that in turn transmits part of the incident beam and reflects the other part towards the following stage of the cascade. This can be realized by not completely filling the space comprised between a pair of electrodes: the part of the luminous beam meeting the globule is transmitted, the remainder of the beam being reflected. It is possible, for example, to transmit half of the energy of a luminous beam towards one fibre and the other half towards another fibre. It is also possible, by acting on the surfaces of the electrodes, to transmit and reflect determined traction-s of an incident luminous beam.

On the contrary, it is possible to get access to a single fibre, starting from a plurality of fibres. This case corresponds, for example, to a subscriber's service that requests data from one bank among several banks, or a video programme selected from a group of several programmes.

We claim:

1. An optical change-over device for commutating at least one incident luminous beam by electrically controlled change-over means, these change-over means operating by having in the path of the said beam either a first fluid provoking the reflection of the beam, or a second fluid provoking its transmission, the device comprising two elements forming total internal reflection prisms placed parallel and opposite each other with reference to their hypotenuses and defining a confinement space containing the said fluids, the fluids not being miscible and possessing distinct dielectric permittivities; inductor means for inducing an electric field gradient causing the fluid having the strongest permittivity to converge toward a selected one of a plurality of zones of a confinement space, which space is exposed to an electric field; wherein one of the said prisms is truncated so as to present a face parallel to said hypotenuses and the other prism extracts the commutated beam through a plurality of outputs;

wherein said incident luminous beam is introduced by said truncated prism and selectively transmitted to a first output when said second fluid is present at a first of said plurality of zones and is selectively reflected to said face parallel to said hypotenuses when said first fluid is present at said first zone and reflected from said parallel face in a direction parallel to said incident beam to a second of said plurality of zones and is selectively transmitted to a second output or reflected to the face parallel to said hypotenuse by the presence of the second or first fluids, respectively, at said second zone and selectively transmitted or reflected at each succeeding zone, any part of said incident luminous beam not being transmitted to an output is substantially completely reflected to a surface of said truncated prism.

2. An optical change-over device according to claim 1, wherein the said inductor means comprise at least two pairs of electrodes, each pair forming a capacitor, the said fluids acting as dielectrics with respect to the electode pairs.

3. An optical change-over device according to claim 1, wherein the said face parallel to said hypotenuses is polished.

4. An optial change-over device according to claim 1, wherein the first fluid is air, the second fluid being a hydrocarbon.

5. An optical change-over device according to claim 1, wherein the at least one incident commutated luminous beam is conveyed by an optical fiber.

6. An optical change-over device according to claim 5, wherein index gradient lenses optically connect the optical fiber and the elements defining the confinement space.

7. An optical change-over device comprising:
a first internal reflection triangular prism having a hypotenuse face, a first leg face and a second leg face perpendicular to said first leg face;
a second internal reflection truncated triangular prism having a hypotenuse face parallel to and spaced a small distance from said hypotenuse face of said first internal reflection triangular prism, a first leg face being parallel to and shorter than said first leg face of said first internal reflection triangular prism, a second leg face parallel to and shorter than said second leg face of said first internal reflection triangular prism and a truncation face parallel to said hypotenuse face of said second internal reflection truncated triangular prism;
a confinement space between said hypotenuse faces;
a first fluid in said confinement space which is light reflective;
a second fluid in said confinement space which is light transmissive and which is not miscible with said first fluid and which possesses different dielectric permittivities than said first fluid;
at least two pairs of transparent electrodes, with one electrode of each pair being mounted on each hypotenuse face opposite the other electrode of the pair, each pair of electrodes being selectively connected to an electrical source to induce an electric field gradient and cause the fluid having the strongest permittivity to be attracted to the selected electrode pair;
an input optical fiber connected to said first leg face of said second internal reflection truncated triangular prism;
a plurality of output optical fibers connected to said first leg face of said first internal reflection triangular prism with one of said optical fibers being associated with each pair of electrodes and being spaced from said second leg of said first internal reflection triangular prism by the same distance as said associated electrode, wherein the first output optical fiber, which is closest to said second leg of said first internal reflection triangular prism, and said input optical fiber form a line which is parallel to said second leg of said first internal reflection triangular prism;
wherein an input light signal carried by said input optical fiber is introduced to said second internal reflection truncated triangular prism through said first leg thereof, parallel to said second leg thereof, and is selectively transmitted to said first output optical fiber when said second fluid is present at the associated electrode pair and is selectively reflected to said truncation face in a path parallel to said first leg face when said first fluid is present at the associated electrode pair and reflected from said truncation face in a path parallel to said second leg to the position of the next pair of electrodes, and is selectively transmitted through the associated output fiber or reflected to the truncation face by the next pair of electrodes and each succeeding pair of electrodes in order;
said electrode having substantially complete transmission and reflection characteristics so that substantially the entire input light is received by the selected one of said output optical fibers; and
wherein any part of said input light signal not received by a selected output optical fiber is substantially completely reflected to said second leg face of said second internal reflection truncated triangular prism.

8. An optical changeover device according to claim 7 further comprising an index gradient lens connected between said input optical fiber and said first leg face of said second internal reflection truncated triangular prism; and
an index gradient lens connected between each optical output fiber and the first leg face of said first internal reflection triangular prism.

9. An optical change-over device for commutating at least one incident luminous beam by electrically controlled change-over means, these change-over means operating by having in the path of the said beam either a first fluid provoking the reflection of the beam, or a second fluid provoking its transmission, the device comprising two elements forming total internal reflection prisms placed parallel and opposite each other with reference to their hypotenuses and defining a confinement space containing the said fluids, the fluids not being miscible and possessing distinct dielectric permittivities; inductor means for inducting an electric rfield gradient causing the fluid having the strongest permittivitiy to converge toward a zone of confinement space, which space is exposed to an electric field; wherein one of the said prisms is truncated so as to present a face parallel to said hypotenuses and wherein at least one of the possible optical paths for the beam comprises at least one total internal reflection on the same face parallel to said hypotenuses, the other prism extracting the commutated beam, the extraction prism having an output leg provided with steps, each connected to a different output fibers so that the distance from the confinement space to each output fiber is constant.

* * * * *